(12) United States Patent  (10) Patent No.:  US 11,024,098 B1
Drake et al.  (45) Date of Patent:  Jun. 1, 2021

(54) AUGMENTING A PHYSICAL OBJECT WITH VIRTUAL COMPONENTS

(71) Applicant: Disney Enterprises, Inc., Burbank, CA (US)

(72) Inventors: Corey D. Drake, Sunland, CA (US); Kenneth J. Mitchell, San Jose, CA (US); Rachel E. Rodgers, Orlando, FL (US); Joseph G. Hager, IV, Valencia, CA (US); Kyna P. McIntosh, Los Angeles, CA (US); Ye Pan, Glendale, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/916,307

(22) Filed: Jun. 30, 2020

Related U.S. Application Data

(60) Provisional application No. 62/975,602, filed on Feb. 12, 2020.

(51) Int. Cl.
```
G06T 19/00    (2011.01)
G06F 3/01     (2006.01)
G06T 19/20    (2011.01)
```
(52) U.S. Cl.
CPC ............ *G06T 19/006* (2013.01); *G06F 3/011* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2013/0249947 A1* | 9/2013 | Reitan | G06F 3/011 345/633 |
| 2013/0293468 A1* | 11/2013 | Perez | G06F 21/32 345/158 |
| 2020/0334127 A1* | 10/2020 | Papp | G06T 13/80 |

OTHER PUBLICATIONS

Rekimoto Matrix: A RealTime Object Identification and Registration Method for Augmented Reality, Aug. 6, 2002, IEEE, 1-6 (Year : 2002).*
Gerhard et al., Continuous Presence in Collaborative Virtual Environments: Towards a Hybrid Avatar-Agent Model for User Representation, Dec. 1-19, 2001, (Year: 2001).*

(Continued)

*Primary Examiner* — Robert J Craddock
(74) *Attorney, Agent, or Firm* — Farjami & Farjami LLP

(57) ABSTRACT

Systems and methods are presented for immersive and simultaneous animation in a mixed reality environment. Techniques disclosed represent a physical object, present at a scene, in a 3D space of a virtual environment associated with the scene. A virtual element is posed relative to the representation of the physical object in the virtual environment. The virtual element is displayed to users from a perspective of each user in the virtual environment. Responsive to an interaction of one user with the virtual element, an edit command is generated and the pose of the virtual element is adjusted in the virtual environment according to the edit command. The display of the virtual element to the users is then updated according to the adjusted pose. When simultaneous and conflicting edit commands are generated by collaborating users, policies to reconcile the conflicting edit commands are disclosed.

20 Claims, 8 Drawing Sheets

(56) References Cited

OTHER PUBLICATIONS

Pan et al.; "Empowerment and embodiment for collaborative mixed reality systems"; Computer Animation & Virtual Worlds; vol. 29; 2018; e1838; 11 pages.

"The place for events"; https://allvr.com/; Microsoft; ©2020; accessed Nov. 2, 2020; 3 pages.

Bobby Carlton; "Disney's PoseVR Tool Lets Animators Create in VR"; https://vrscout.com/news/disneys-posevr-animation-tool/; VRScout Inc.; Nov. 2018; accessed Oct. 30, 2020; 13 pages.

"NVRMIND"; https://nvrmind.io/#features; accessed Oct. 30, 2020; 9 pages.

* cited by examiner

100

200

300

400

800

AUGMENTING A PHYSICAL OBJECT WITH VIRTUAL COMPONENTS

CROSS REFERENCE TO RELATED APPLICATION

This application claims the benefit of U.S. Provisional Application No. 62/975,602 filed on Feb. 12, 2020, the disclosure of which is incorporated by reference herein.

BACKGROUND

The present disclosure relates to the production of entertainment shows involving the choreographing of characters including physical and computer-generated components.

Animating an articulated character—i.e., determining the three-dimensional (3D) pose of each joint of the character in each key-frame of an animation clip—is a complex and time-consuming process. Conventional character animation for films or game production is performed with software applications—such as Maya, 3DS Max, and Blender—via two degrees of freedom (2DoF) interfacing means and two-dimensional (2D) display feedback. However, the process of creating a character's expressive motion through posing is limited by the 2D medium. Interfacing devices that allow for posing of a character through 3D spatial inputs, such as a Leap Motion device or physical objects (i.e., puppets), introduced improvements, but are still limited in providing a relative scale and perspective when animating in coordination with or relative to other show elements in the shared space of the scene.

Recent advances in Virtual Reality (VR) technologies provide users with an immersive virtual environment through which they can interact with VR elements generated by the VR system. Consumer VR systems, typically, include a head-mounted display (HMD) and handheld controllers equipped with sensors, with which the 3D location and orientation of the HMD and controllers in the virtual environment are tracked. Thus, a user, wearing the HMD and holding the controllers, may be provided with a stereoscopic view of the virtual environment where that view is an image projection of the virtual environment from a perspective of the user (a perspective that is derived from the user's head location and orientation as measured by the HMD's sensors). Further, the user may affect the virtual environment using the hand-held controllers via an interface determined by the VR system. In some VR systems, more than one user may interact with the virtual environment (e.g., multi-player games).

VR systems that enable a user, equipped with an HMD and hand-held controllers, to move around within a 3D space and interact with virtual elements within a virtual environment may be applied for developing animation clips. In such an application of a VR system, a user animator may be provided with a stereoscopic view of an articulated character (i.e., a virtual object defined within a 3D space of a virtual environment) and may be able to spatially pose the character's joints in the 3D space using the hand-held controllers. Animation tools for posing animated characters in a virtual environment have been developed, such as AnimVR, PoseVR, and Tvori. However, these applications are typically limited to the animation of virtual elements in a purely virtual environment. No tools are available for editing articulated characters in a mixed reality (MR) environment—wherein techniques of augmented reality (AR) are used to augment a physical object with a virtual element so that a user may be able to observe both the physical object and the virtual element and to pose the virtual element relative to the physical object in the 3D space.

Directing animated content created in VR environments involves directorial and artistic reviews. Such reviews, typically, may be carried out by a director reviewing in a VR environment and by other artists reviewing in a 2D environment (using 2D displays). Although several tools allow for immersive animation by multiple users—such as Alterspace VR, MuVR, and MetaSpace—none of these applications provide tools for animating poseable characters. Existing systems for immersive animation do not provide a collaborative platform wherein users may adjust a character's pose in a shared virtual environment and, concurrently, may view in real-time their own and other users' adjustments from each own 3D perspective in the virtual environment. Moreover, no system for immersive and collaborative animation of posable characters provides means to animate virtual elements in coordination with, and relative to, physical objects in an MR environment.

DETAILED DESCRIPTION

Figure 1:
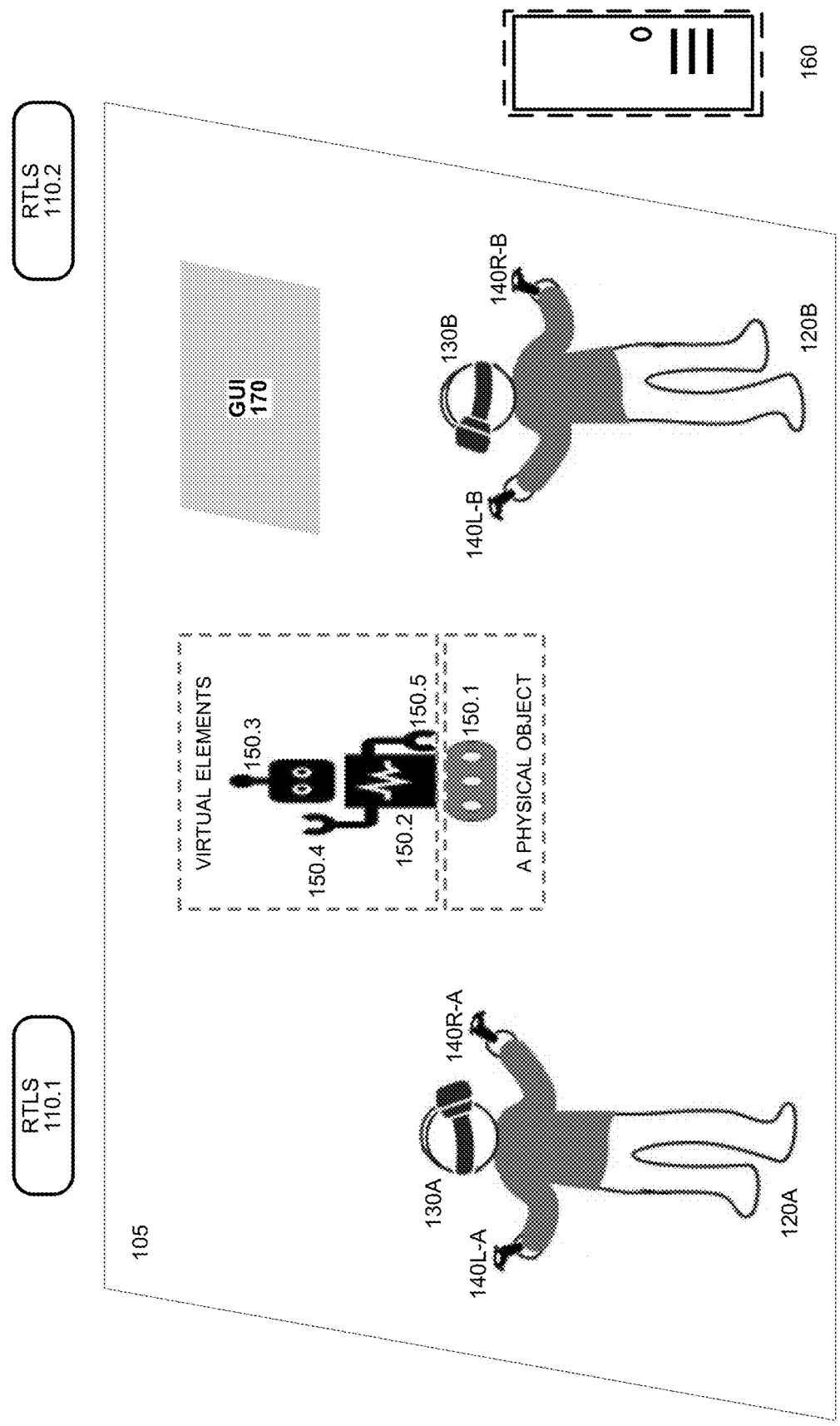
FIG. 1 illustrates a collaborative animation editing system used by users operating at a shared scene, according to an aspect of the present disclosure.

Systems and methods are disclosed for immersive and simultaneous animation in an MR environment; aspects disclosed herein describe techniques for collaborative animation of virtually augmented physical objects. For example, a physical object, present at a scene, may be represented by a 3D model in a virtual environment associated with the scene. The method may pose a virtual element at a location relative to the 3D model of the physical object in the virtual environment. The method may present the virtual element to users from a perspective of each user in the virtual environment. Responsive to an interaction of one user with the virtual element, the method may generate an edit command based on data received from a controller operated by that user and may adjust the pose of the virtual element in the virtual environment according to the edit command. The method may then update the presentation of the virtual element to the users according to the adjusted pose.

Users of systems and methods described herein may be able to edit the pose of an animated character synchronously or in real-time. An animated character may be part of a show that involves physical objects relative to which the animated character is posed. An animated character may also consist of physical objects of a partially constructed robot and virtual elements that visualize parts of the robot yet to be constructed or that are adapted (e.g., clothed, skinned or visually accessorized) for a particular context virtually rather than physically. Accordingly, the MR environment described herein may contain virtual elements, e.g., computer generated elements that may be posed in a 3D space of a virtual environment. The MR environment may also contain 3D models, representing physical objects or live objects present at a real-world scene, defined in the 3D space of the virtual environment. The virtual elements may be posed relative to the 3D models and may be presented to a user from that user's viewing perspective in the 3D space. Thus, a user (such as a director or an animator) may be provided with an immersive experience where she may interact with physical and virtual elements and may view in real-time the effect of this interaction as well as the effects of concurrent interactions made by other users. In an aspect, if simultaneous and conflicting edits are made by collaborating users, policies may be applied to reconcile the conflicting edits.

Techniques disclosed herein may facilitate the development of a show that may include a partially constructed physical object such as a robot. Part of the process of choreographing a character that is participating in a show may include determining the appearance and the movements of that character at the scene. In an aspect, to allow for the choreographing of parts of a robot (e.g., the upper body parts) before their design and physical construction have been completed, techniques described herein may be used to virtually augment the already partially built robotic parts (e.g., the lower body parts) by virtual elements, visualizing the yet to be constructed robotic parts in a virtual environment. Hence, techniques disclosed herein may allow for the creation of a virtual robotic part and the posing and the animating of that virtual robotic part relative to a physical robotic part—enabling posing and animating under spatial constraints that stem from the presence of other characters or physical objects at the scene or under constraints that stem from required safety envelopes. In an aspect, in addition to posing and animating of the virtual robotic parts, a user may edit the appearance of those virtual robotic parts by mapping textures on the surfaces of those parts.

Furthermore, the systems and methods disclosed herein may be used to develop visual effects. A visual effect may be represented in the 3D space of the virtual environment associated with a show's scene. The visual effect may then be spatially posed and animated relative to a 3D model, representing the robot in the 3D space, for example, and may be inserted (overlaid) into the show's video in perspective using augmented reality techniques. For example, in an aspect, virtual effects may be overlaid into the (live or recorded) video of the show so they appear to be physically influenced by the robot or by other physical objects situated in the show's scene.

FIG. 1 illustrates a collaborative animation editing system 100 used by users operating at a shared scene, according to an aspect of the present disclosure. The system 100 may comprise Real Time Localization Systems (RTLS) 110.1, 110.2, head-mounted systems 130A, 130B, handheld controllers 140L-A, 140R-A, 140L-B, 140R-B, and a computing unit 160. The system 100 may provide an immersive environment to a collaborating first user 120A and second user 120B, wherein a user may be a director, an animator, or any other artist. Typically, a user, 120A or 120B, wears a head-mounted system, 130A or 130B, and holds at her hands two controllers, 140L-A and 140R-A, or 140L-B and 140R-B, respectively. In such an environment, virtual elements may be interacted with simultaneously so that adjustments made to the pose of a virtual element by one user 120A may be immediately visible to another user 120B. For example, virtual elements may be computer generated elements, posed in a 3D space of a virtual environment, that visualize a robot's upper body (e.g., an abdomen 150.2, a head 150.3, or limbs 150.4, 150.5). A 3D representation in the 3D space may model the robot's lower body 150.1.

The RTLS 110.1, 110.2 may provide real-time 3D tracking data of objects at the scene 105. Typically, positional data may be derived from measurements of signal propagation between readers (e.g., RTLS 110.1, 110.2) and transceivers (e.g., sensors). Thus, signals that may be transmitted from (or received by) RTLS 110.1, 110.2 to (or from) sensors attached to objects at the scene may be utilized to compute the location and orientation of these objects based on triangulation-based techniques, for example. Alternatively, any tracking and localization technology may be used that provides sufficiently accurate and precise absolute or relative position and/or orientation data to meet the needs of a particular application, including other RF techniques, LIDAR, acoustic, marker-based, image-based techniques and the like, used alone or in combination. In an aspect, sensors attached to a user's head-mounted systems 130A-B may provide live 3D data, including location and orientation of the user's head in the 3D space; these positional data may be used to render a view of the 3D space for that user from that user's viewing perspective at the scene. Likewise, sensors attached to a user's controller 140L-A or 140R-A may provide live 3D data, including location and orientation of the user's hand in the 3D space; these positional data may be used to determine what element in the 3D space that user interacts with.

Figure 2:
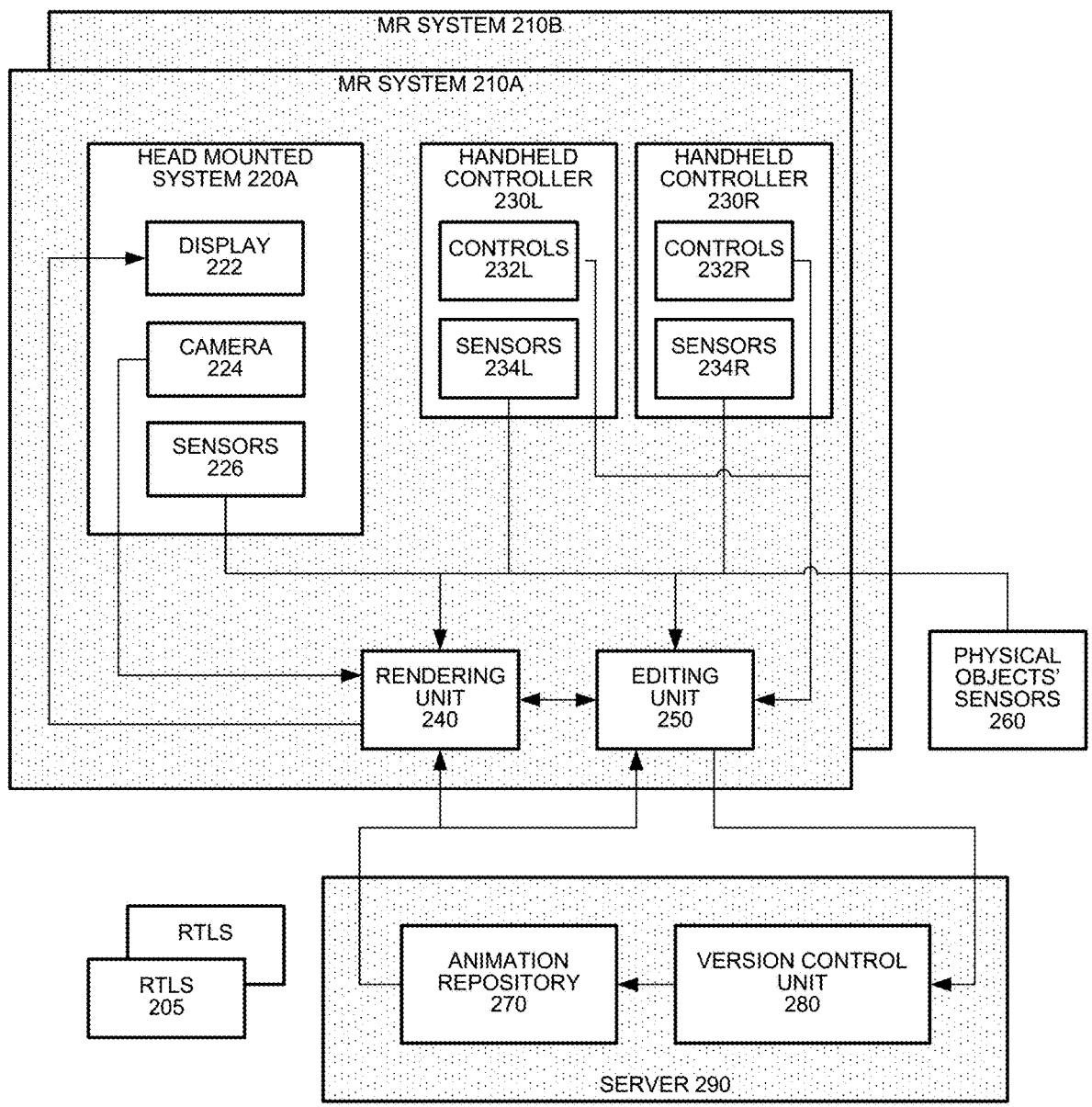
FIG. 2 is a block diagram of a collaborative animation editing system, according to an aspect of the present disclosure.

The computing unit 160 may comprise editing 250, rendering 240, version control 280, and repository 270 components (see FIG. 2). The editing component may generate virtual elements and 3D models of physical objects that may be stored in the repository and may translate data received from the system 100 (e.g., responsive to user actions) into edit commands; the version control component may apply the edit commands and may commit their effect to respective virtual elements in the repository; the rendering component may generate image projections of virtual elements in the repository to each user based on each user's location and head orientation. In an aspect, the editing component may also generate graphical user interface (GUI) elements 170. A GUI element 170 may be presented to each user of the system 100 from a perspective convenient for that user; the user may then engage with the GUI element via her handheld controllers during the animation process as described herein.

Figure 5A:
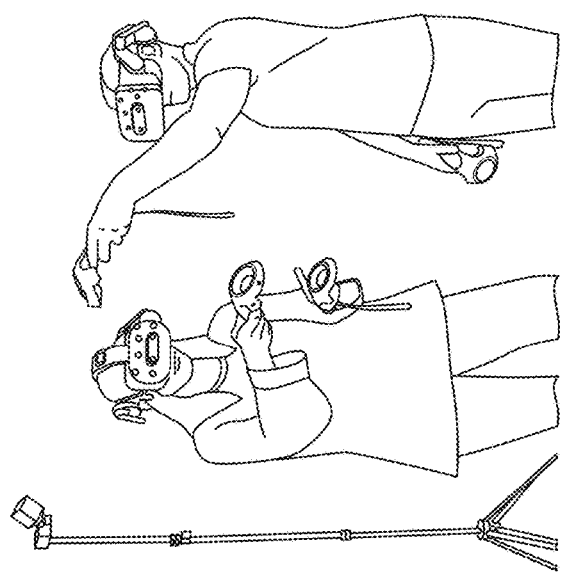
FIG. 5 demonstrates an immersive editing of a virtual element (5B-C) performed simultaneously by two animators (5A), according to an aspect of the present disclosure.
Figure 5B:
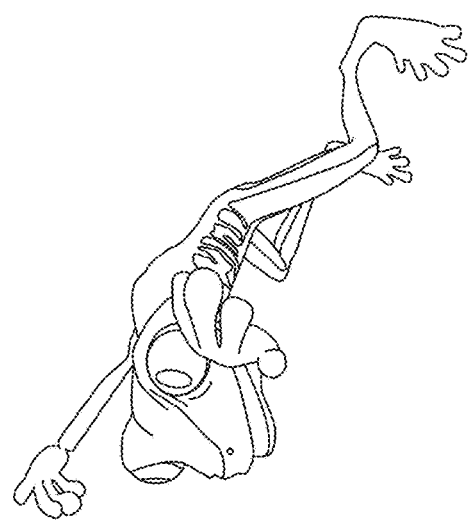
Figure 5C:
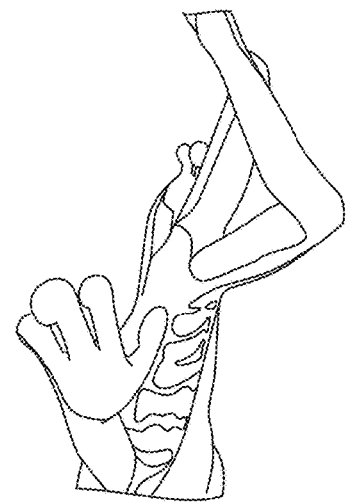

FIG. 5 demonstrates an immersive editing of a virtual element performed simultaneously by two animators, according to an aspect of the present disclosure. FIG. 5 is described in reference to FIG. 1, as follows. FIG. 5A shows two animators, users of systems and methods disclosed herein, sharing a physical scene 105. The animator on the right 120A wears a head-mounted system 130A and holds in his hands two hand-held controllers 140L-A and 140R-A. Similarly, the animator on the left 120B wears a head-mounted system 130B and holds in her hands two hand-held controllers 140L-B and 140R-B. Both animators are shown to interact with a virtual character, the animated frog shown in FIG. 5B-C; such an interaction may include selecting a joint of the virtual element by pointing at it, and, then, generating an edit command by operating one of the controller's interfacing means, for example. Each animator views the virtual character from each own's perspective—the animator on the right 120A views the virtual character from his own perspective, as shown in FIG. 5B, and the animator on the left 120B views the same virtual character from her own perspective, as shown in FIG. 5C.

As demonstrated in FIG. 5A, when multiple users of the immersive editing system 100 work at the same shared space 105 they may interfere with each other's interactions with virtual elements. For example, a collision (a spatial overlap) may occur when users work in different timelines and/or different animation layers. In such a case, the system 100 may provide a visual cue to the users, indicating a potential collision. Users may also be working concurrently in different timeframes. For example, in a live immersive setting, one user may examine the character's form in slow motion, while the other may be focusing on a single frame. In an aspect, the system 100 may flag when edits of a common keyframe are in conflict (i.e., when that keyframe is concurrently viewed by multiple users), even when the users are viewing or editing frames, including the keyframe, in different timeframes. In an aspect, users may work at the same time rate (e.g., on a synchronized timestamp), or, alternatively, each user may work at a different time rate. For example, one operator may be fine-tuning facial movements, while the other user may be adjusting body walking poses. Or both users may be working at the same time rate, but may be independently previewing their edits, e.g., locally and independently animating at full speed.

FIG. 2 is a block diagram of a collaborative animation editing system 200, according to an aspect of the present disclosure. FIG. 2 is described in reference to FIG. 1, as follows. The system 200 may comprise multiple MR systems, 210A-B, each associated with a user, 120A-B. The system 200 may also include multiple units of RTLS 205 that—in cooperation with sensors 226, 234, and 260 of system 200—may facilitate the provision of positional tracking data. The positional data may include real-time location and orientation data of objects the sensors are attached to, such as the head-mounted systems 130, the handheld controllers 140, or other physical objects at the scene 105. The system 200 may also include a server 290, comprising an animation repository 270 and a version control unit 280. The animation repository 270 may store and maintain 3D data representations of virtual elements, physical objects, and other data that may be used to carry out animation operations. The version control unit 280 may resolve conflicting edit commands before committing their effect to the repository 270.

Components of system 200 may be linked to each other via wired or wireless communication links. For example, positional data may be transmitted from the RTLS 205 or from the various sensors 226, 234, 260 to other components of the MR systems 210A-B or server 290 utilizing Wi-Fi or Blue-tooth protocols. Video captured by cameras 224 or viewed at displays 222 of the head mounted systems 220 may be transmitted to or from the rendering unit 240 via wired communication channels, wireless communication channels, or a combination thereof. The server 290 may be local to one of the MR systems 210A-B or may be remotely linked to them via a communication network.

An MR system 210 may comprise a head-mounted system 220, handheld controllers 230L and 230R, a rendering unit 240, and an editing unit 250. In an aspect, users 120A and 120B of respective MR systems 210A and 210B may be collaborating while sharing the same physical scene 105, as illustrated in FIG. 1 and FIG. 5; such users may be interacting with the same virtual environment stored in the repository 270 and presented to them by their respective MR systems, while being able to view each other's presence, and the presence of other physical objects, at the shared scene. Alternatively, users 120A and 120B of respective MR systems 210A and 210B may be collaborating remotely, each interacting with the same virtual environment stored in the repository 270 and presented to them by their respective MR system; each of those users may be able to view only a virtual representation (an avatar) of the other user, and may each be able to view only a virtual representation of the physical objects that are located at the other user's scene, as explained further with respect to FIG. 3.

The head-mounted system 220A, mounted on a user's 120A head, may comprise a display 222, a camera 224, and sensors 226. The sensors 226 may be configured, in cooperation with RTLS 205, to measure location and orientation data of the user's head and to deliver the measured data to the rendering unit 240. The camera 224 may be any capturing device, such as a stereoscopic video camera, and may be configured to provide the rendering unit 240 a field of view of the scene from the user's 120A perspective. The display 222 may be configured to present to the user 120A the virtual environment (stored in the repository 270) from a perspective of the user 120A; the user's perspective may be generated by the rendering unit 240 based on the current location and orientation of the user's head measured by the sensors 226. The virtual environment presented to the user 120A may be overlaid on the video captured by the camera 224, forming an AR view—that is a composition of a real-world image of the scene (as captured by the camera 224) with an image projection of the virtual environment (as presented to the user 120A). System 220B may similarly applied to user 120B. In aspects disclosed in the present disclosure, systems 220A and 220B are described as video see-through AR systems, however, the techniques taught herein are readily adaptable to optical see through AR systems that provide a per-user perspective presentation of the virtual environment. In a case where user 120A and user 120B are remotely collaborating, the virtual environment presented to user 120A may include a representation of a physical object (avatar) representing user 120B or may include representations of physical objects that may be present only at the scene of user 120B.

Hence, users of the MR systems 210A and 210B may each be able to view an image projection of the real-world scene 105 they are operating from, as is being captured by each user's head-mounted camera 224. Furthermore, each user may be able to view an image projection of virtual elements rendered 240 from each user's viewing perspective at the scene. In an aspect, users may view on their respective displays 222 an AR presentation—e.g., the image projection of the virtual elements overlaid on (or aligned with) the image projection of the real-world scene. For example, an image projection of the real-world scene may include an image of a physical object such as a partially constructed robot 150.1. An image projection of virtual elements may include elements that visualize parts of the robot that are not yet constructed 150.2-150.5 or virtual effects associated with the robot 150. The MR system 210 may use a 3D model—a representation of the physical object in the 3D space of the virtual environment—to properly position (or align) a virtual element relative to the physical object the user may be viewing through her head-mounted camera. Thus, a 3D model of the physical object may be derived from the captured 224 video, from sensory 260 data, or a combination thereof. For example, sensors 260 may be attached to the physical object and may provide location and orientation data that in turn may be used by the editing unit 250, for example, to construct the 3D model. So, virtual elements associated with the physical object may be posed in the 3D space of the virtual environment relative to the 3D model of the physical object. 3D models of physical objects and associated virtual elements may be stored in the animation repository 270 and may be updated as the location and orientation of respective physical objects change at the scene.

Users of the system 200 may simultaneously interact with (i.e., edit) a character's virtual elements, stored in the animation repository 270, via an interface defined by the editing unit 250, for example. Such an interface may be represented by a virtual GUI element 170, conveniently positioned in front of each user. Users may interact with the GUI 170 by means of the handheld controllers 230. Typically, one controller is held in the right hand 230R and the other in the left hand 230L. A handheld controller 230 may comprise controls 232 such as a trigger, a touchpad, and buttons. A handheld controller 230 may also comprise sensors 234 that, cooperatively with the RTLS 205, may measure positional data, e.g., the location and orientation of the handheld controller. Based on the positional data of each handheld controller, the editing unit 250 may determine, where the user is pointing to—e.g., which joint of which virtual element the user has selected to edit or which function of the GUI 170 the user has selected to perform the editing according to. Thus, using the handheld controller 230 the user may point in a certain direction (pointing at a joint of a character 150 or a function of a GUI 170) and then may press one of the controls 232 to generate a certain edit command—e.g., pointing to a joint and dragging that joint to a new spatial location in the virtual environment.

Figure 6:
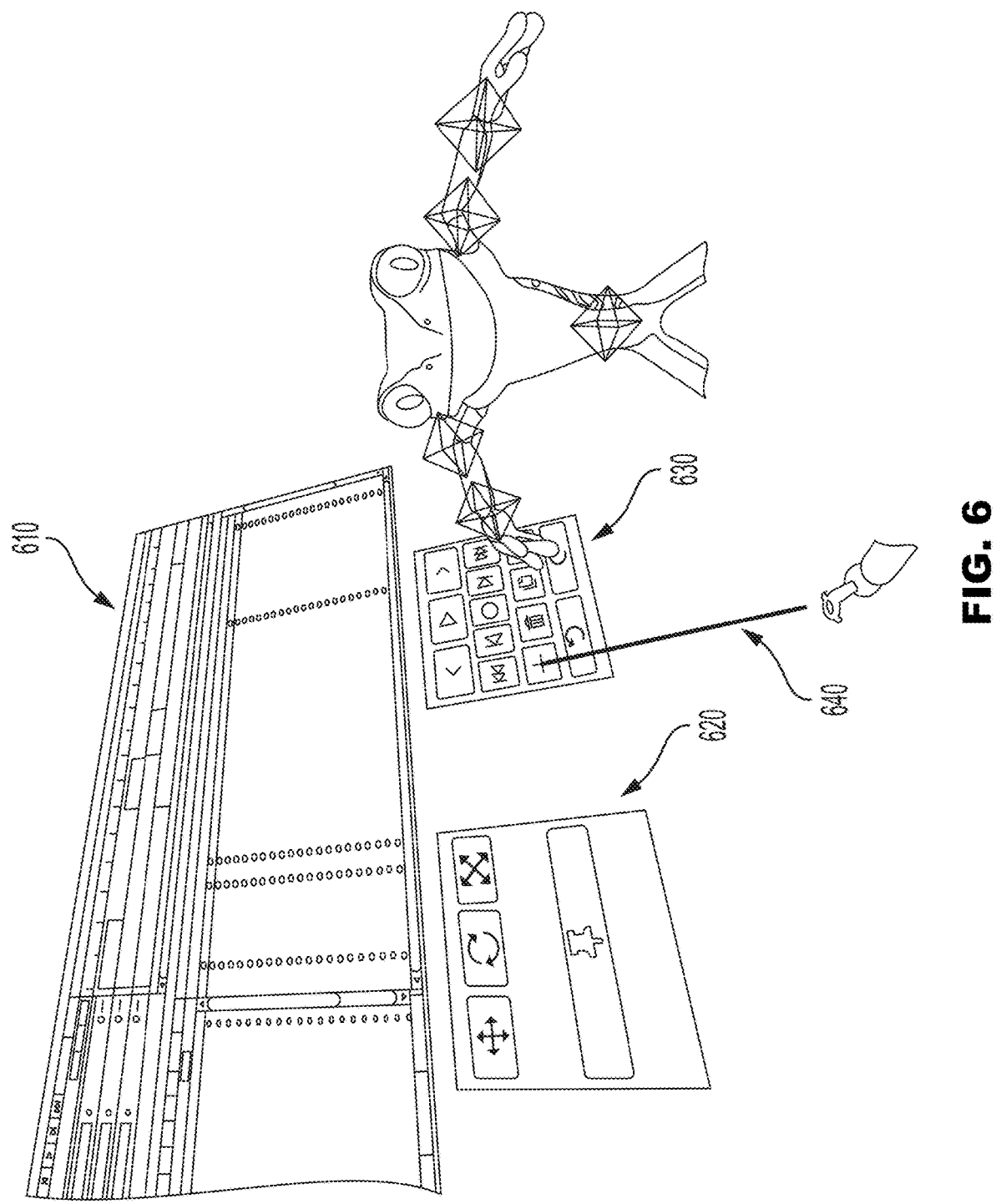
FIG. 6 illustrates an image projection of a virtual environment, including an animated character (a frog) and GUI elements, according to an aspect of the present disclosure.

FIG. 6 illustrates an image projection of a virtual environment, including an animated character (a frog) and GUI elements, according to an aspect of the present disclosure. In FIG. 6 there are shown three GUI elements, 610, 620, 630, with which a user may interact. The system 200 may visualize a direction indicator 640—i.e., a line that extends from the controller to the spatial location of a singled-out part of a virtual element (e.g., a button of a GUI 630 element)—to provide a visual feedback to the user reflecting the location at the virtual element the user is currently pointing to.

The editing unit 250, presented herein, may receive positional data from sensors 234 and control data from the controllers 232 that are responsive to the user's manipulation of its handheld controllers 230. Those positional and control data may then be translated into edit commands that may be operable on a virtual element stored in the animation repository 270. For example, positional data received at the editing unit 250 may indicate: a selection of a certain function or mode from a GUI element 170, a selection of a joint to act upon, and a new location at the 3D space; and, the control data received at the editing unit 250 may indicate the user's intent to apply the new location to the selected joint, in accordance with the selected function or mode at the GUI element 170. Thus, in response, the editing unit 250 may translate these positional and control data into an edit command (e.g., prescribing the desired change of a joint's position) and may send this edit command to the version control unit 280. If the edit command is not in conflict with a concurrent edit command received by an MR system employed by another user, the version control unit 280 may commit to the repository 270 the effect of the edit command (e.g., a change to the selected joint of the virtual element being edited as prescribed by the edit command).

System 200 may allow users to simultaneously adjust the pose of a virtual element of an animated character through spatial interactions with the element's joints. Thus, users of the system 200 may concurrently engage in an immersive posing of virtual elements presented to them by the rendering unit 240 from their own perspective at the scene 105. A user may interact with an articulated virtual element by, for example, pointing, selecting, and dragging a graphical element associated with a joint (or multiple joints) of the virtual element. A user may pose a character by employing inverse kinematics (IK)-based techniques or forward kinematics (FK)-based techniques. In an IK-based technique, for example, a limb's rotation is computed based on the position of the end-effector. In an FK-based technique, that limb is rotated directly.

Figure 7A:
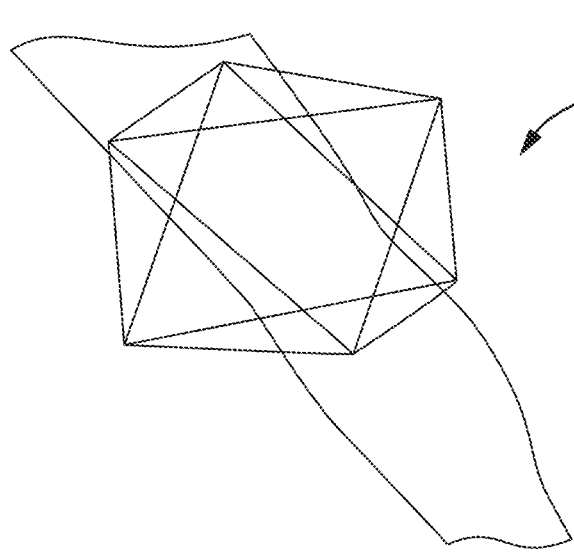
FIG. 7 illustrates a graphical representation of pose-controls: an IK-control (7A), an FK-control (7B), and a global control (7C), according to an aspect of the present disclosure.
Figure 7B:
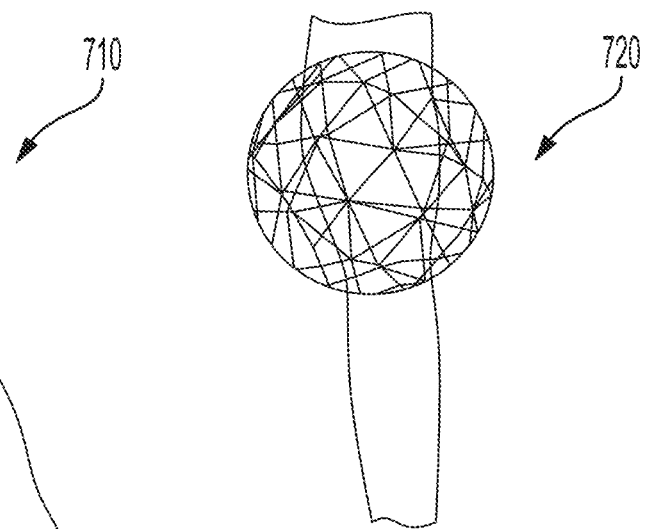
Figure 7C:
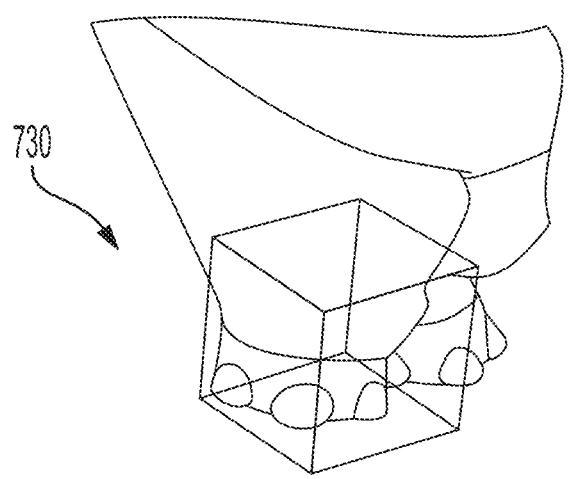

FIG. 7 illustrates a graphical representation of pose-controls: IK-control (FIG. 7A), FK-control (FIG. 7B), and global control (FIG. 7C), according to an aspect of the present disclosure. In an aspect, three types of pose-controls may be associated with a joint (or multiple joints) and may be manipulated by a user: an IK-control, an FK-control, and a global control. As illustrated in FIG. 7, a distinct graphical element may be overlaid on the image projection of a character's joint to indicate the availability of an IK-control 710 (as shown overlaid on the knee of a frog character), an FK-control 720 (as shown overlaid on a knee of a giraffe character), and a global control 730 (as shown overlaid by the feet of an elephant character). The user may then use her handheld controller to select a graphical element associated with a joint (e.g., 710, 720, or 730) and may move or rotate the joint via the graphical element. For example, a user may move or rotate a joint by moving or rotating the joint's pose-control (e.g., 710, 720, or 730) and then activating a button on the controller.

When the posing of a character's joint employs an FK-based technique, the joint may be directly rotated at a desired orientation. Thus, each joint in a chain of joints may inherit the rotation employed to its parent. For example, for a character with four joints in a chain, when a user rotates the root-joint, its three child-joints may move based on the rotation of the root-joint. This chain effect may be useful for basic animation of the arms of a character for example but may be a tedious operation for the animation of joints of virtual elements that may require displacement, such as the animation of a character's legs when animating walking or jumping. When the posing of a character's joint employs an IK-based technique, a rotation of the joint may be computed based on the positioning of an end-effector. Such an approach may allow for a more efficient posing process as it may reduce the number of joints that may require adjustment for a resulting posing of a character. A global-control (or a master-control) on the other hand may be used by a user to adjust the position, orientation, and scale of a whole character, including multiple joints. In an aspect, utilizing spatial awareness and immersive experience, a user may create a motion path in a 3D space. A user may create such a motion path by grabbing the global-control of a character and pressing a record button on the controller. The recorded movement may then be applied to the animated character.

Typically, to carry out the animation of a character, animators set the pose of a character and associated attributes with respect to each key-frame of a video clip. Then, animation is resulted by interpolating the values of the poses and the associated attributes of the character for frames in between neighboring keyframes. In an aspect, a virtual timeline window may be presented to the user 610 (FIG. 6). The user may interact with the virtual timeline by pointing to it with the controller. The system may visualize a direction indicator—e.g., a line extending from the controller to a location at the timeline image—to provide a visual feedback to the user, reflecting the location at the timeline the user is pointing to. The user may select an animation clip from the global timeline for which she wants to place a keyframe on by pointing to the timeline window and pulling the trigger on her controller. The user may move a timeline marker, indicating a current frame, to a place at the clip's timeline where she wants to insert a new keyframe (or edit an existing keyframe) by dragging the timeline marker. An updated keyframe may be represented on the timeline by a thin blue vertical line, for example. Copy, paste, and delete functions applicable to keyframes may also be presented on the timeline window. The touchpads of the controllers may be used for easy-access commands, such as, play animation, return one frame, or go forward one frame. Hence, such an intuitive and immersive timeline window 610 may allow the user to better focus on the posing and animation processes.

Animation layering may provide each collaborator (a user of system 200) an exclusive access to a set of a character's joints, so that one user may pose the upper body and the other user may pose the lower body, for example. In an aspect, animation layers may be used to separate the keyframe data applied to character(s) in an animation clip. This may allow users to create variations of animations reviewable in 3D space or to blend different animations together. For example, animations generated by multiple users of system 200 may be recorded in separate layers, and, then, may be blended together. Alternatively, an animation generated by a user of system 200 may be blended with a recorded pre-generated animation. In an aspect, keyframe data saved in respective layers may serve to organize different parts of an animation. In a further aspect, a global timeline GUI 610 may allow a user to move, scale, delete, and composite animation layers.

In an aspect, users may also edit a character's mesh vertices, including blend weights, and other forms of deformation attributes. In a further aspect, users may edit animation state machines, animation timelines, behavior trees, and blending controls. Physical simulation effects may also be cooperatively edited, for example, the effects of gravity can be incorporated into the virtual character's movements. In an aspect, a virtual element simulating fluid may be cooperatively edited by users of the system 200.

Figure 3:
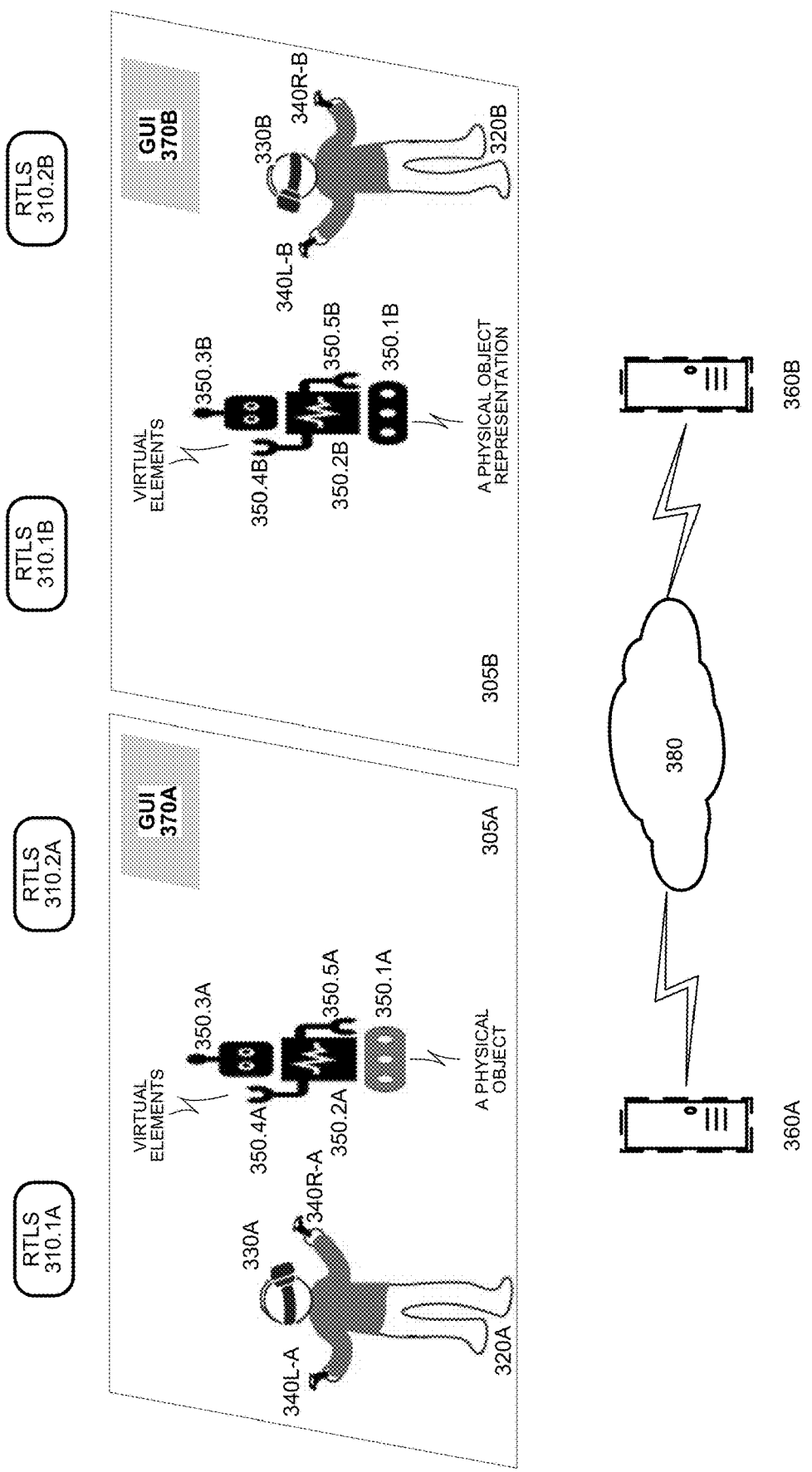
FIG. 3 illustrates a collaborative animation editing system used by users, each operating at a different scene, according to an aspect of the present disclosure.

FIG. 3 illustrates a collaborative animation editing system used by users, each operating at a different scene, according to an aspect of the present disclosure. FIG. 3 is described in reference to FIG. 2, as follows. User 320A may interact with a character 350A from her own physical scene 305A, while user 320B may concurrently interact with the same character 350B from her own physical scene 305B. User 320A may use her respective MR system 210A and user 320B may use her respective MR system 210B. Components of each MR system may be communicatively connected via a communication network 380. For example, computing units 360A and 360B (used by user 320A and 320B, respectively) may each contain editing 250 and rendering 240 components and may each be communicatively connected to a server 290. Server 290 may be located at a remote location (e.g., a cloud server 380) or may be located locally to unit 360A or locally to unit 360B. The server 290 may contain a version control unit 280 and a repository 270.

Each remote user, 320A or 320B, may be able to observe her own and the other user's interactions with the same virtual element; the virtual element may be projected to each user from each user's own perspective within the 3D space of the virtual environment associated with each user's remote scene, 305A and 305B. Accordingly, each user may utilize the features provided by her own MR system 210, and the users' interactions and the resulting changes made to a virtual element will be recorded in a global animation repository 270 in accordance with version control policies 280, as described herein. Thus, in a collaborative editing, a virtual element, that may be posed and may be adjusted and animated by each collaborating user, may be stored in the animation repository 270 from which the most recent version may be retrieved by each user's rendering unit 240 and may be presented to each user from that user's perspective.

Hence, when users of the system 200 described herein share the same scene 105, as illustrated in FIG. 1, each one of them may be visible to each other via their head-mounted camera 224 or via a see-through display 222. When users are collaborating remotely from each other, as illustrated by FIG. 3, each may see a graphical representation (avatar) of each other. For example, an avatar of a first user 320A may be a gender-matched avatar rendered in generic clothing. An avatar may be posed according to positional information measured by the sensors 226 associated with the first user's head-mounted system and the sensors 234L/R associated with the first user's handheld controllers. Thus, 3D location and orientation data that track the head and the two hands of the first user 320A may be made available to the second user's MR system 210B (e.g., via the first user's MR system 210A and the server 290). At the second user's MR system 210B, the editing unit 250, for example, may construct a 3D representation of an avatar of the first user 320A, and the rendering unit 240 may present this avatar to the second user 320B from the second user's perspective in the 3D space. Similarly, physical objects that may be part of the show (e.g., 350.1A), if physically residing only at the first user's scene 305A, may be represented by a 3D model in the 3D space of the virtual environment (e.g., 350.1B) and may be presented to the second user 320B to be viewed from the second user's perspective in the 3D space.

In an aspect, the live collaborative and immersive animation editing system 200 described herein may allow for two or more users to pose and animate characters simultaneously. Accordingly, means for version control 280 and maintenance of a coherent animation repository 270 are disclosed herein. The animation repository unit 270 and the version control unit 280 may be communicatively linked to each MR system, 210A or 210B, associated with each participating user, 120A or 120B. When the animation repository unit 270 and the version control unit 280 reside in a remote server 290, the server 290 may be accessed via a communication network, using suitable communication protocols. Thus, in an aspect, multiple edit commands may be initiated by multiple users concurrently and may be delivered by their respective MR systems 210 to the version control unit 280, the version control unit 280 may then detect and resolve conflicting commands according to predefined policies.

In an aspect, one user's 120A edits to the pose of a character's joint may be immediately presented to another user 120B of the system 200, so that any collaborating user may be able to see the live effect of any other user's edits. In such a configuration, users may make simultaneous changes to the same joint (e.g., by manipulating the same IK-control 710) that may require reconciliation in accordance with version control policies. In an aspect, a graphical element of an IK-control 710, used by a user in generating a conflicting edit, may be visually flagged to denote that a concurrent edit has taken place. The following policy scenarios may be employed by the version control unit 280 to resolve conflicts.

In a first scenario, the version control unit 280 may be configured to maintain a 'master' user, whose changes may override those made by other users. In an aspect, only conflicting edit commands may result in the override of edits made by non-master users. A user's master status may be maintained by the version control unit 280 and may be reassigned to any other user at any time during the animation process. In a second scenario, the version control unit 280 may be configured to follow a most-recently-changed rule, where the most recent edit command received may override those edit commands made previously by other users. In a third scenario, the version control unit 280 may be configured to generate an average edit command obtained from combining the received conflicting edit commands (e.g., an average position, orientation, or scale). In applying one of the scenarios described above, a new (reconciled) edit command may be produced. Then, a change to a virtual element, resulted in by the new edit command, may be committed to the animation repository 280. Such a change may be a new pose for a character's joint and/or a corresponding effect on the character's mesh. Once the resulted new edit command is committed to the repository, it will be rendered 240 by the respective MR system 210, and thus all users may be able to view the effect of the resulted new edit from their own perspective in the virtual environment.

In an aspect, the system 200 may isolate simultaneous edits. For example, an IK-control 710 may be formed locally to affect only sub-parts of the character, e.g., a left-hand IK-control may only affect the pose of the left arm up to the left shoulder. In this case, edits to the left arm may be isolated from edits to the right arm and may be made entirely simultaneously without generating a conflict. Generally, the character may be spatially partitioned into spatial divisions to prevent the triggering of a conflict by the version control unit 280 for concurrent edits associated with pose-controls from different partitions. Similarly, when layered animation is applied, generally, each layer may be edited independently without creating conflicts. However, a dependent layer in an animation, edited by a first user, may affect the pose data of another layer, edited concurrently by a second user. In this case, the second user may flag the dependent layer as fixed until she may wish to update it with the version saved in the repository 270.

Figure 4:
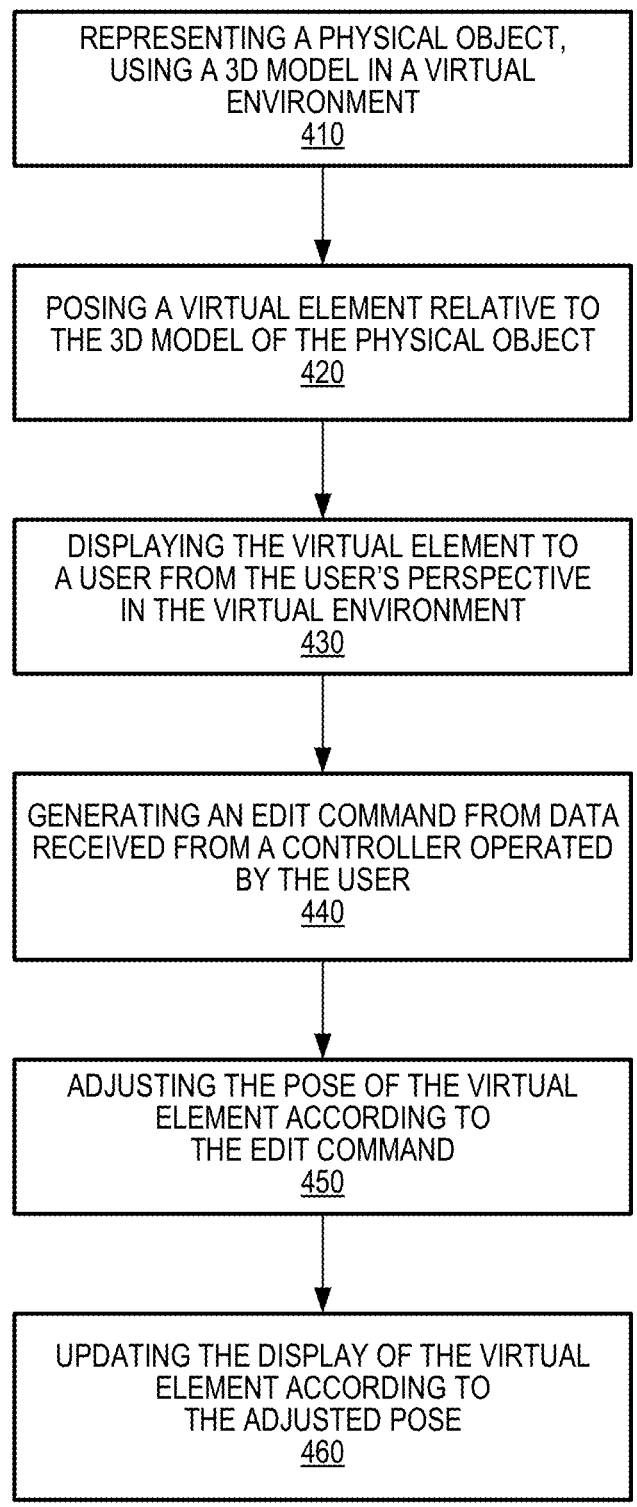
FIG. 4 is a method for immersive editing of an augmented physical object, according to an aspect of the present disclosure.

FIG. 4 is a method 400 for immersive editing of an augmented physical object, according to an aspect of the present disclosure. The method 400 may represent a physical object, present at a scene, using a 3D model in a virtual environment associated with the scene (Box 410). The method 400 may then pose a virtual element relative to the 3D model of the physical object (Box 420) and may display the virtual element to the user from the user's perspective in the virtual environment (Box 430). Next, the method 400 may generate an edit command (Box 440) that may be derived from data received from a controller operated by the user at the scene. Having the generated edit command, the method 400 may adjust the pose of the virtual element in accordance with the edit command (Box 450) and may then update the display of the virtual element to the user in accordance with the adjusted pose (Box 460).

In an aspect, a physical object may be a robot (either partially 150.1 or fully constructed 150.1-150.5) that may be part of a show to be produced. The user, through the camera 224 embedded in her head-mounted systems 220 may be able to observe the robot from her own perspective at the scene. In such a case, a virtual element (produced to augment the robot) may be posed 420 in a 3D space of a virtual environment relative to a representation of the robot in the 3D space. The virtual element may then be projected to a 2D image plane of the camera 224 and may be blended with the image of the robot captured by the camera. The resulted blended image may provide an augmented view of the robot, wherein the user may view the virtual element's projection overlaid on the image of the robot. For example, the image captured by the camera may be the lower body part of a robot 150.1 that is augmented (or overlaid) by image projection of virtual elements visualizing upper body parts 150.2-150.5.

The representation of a physical object (e.g., a robot) in a 3D space 410, may be by means of a 3D model of the physical object. A 3D model of a physical object may be based on a 3D grid representation of the surface of the physical object or based on a skeletal representation, for example. The real-time pose (location and/or orientation) of the 3D model of the physical object in the 3D space may be computed based on positional data received from sensors 260 attached to the physical object. Thus, sensors attached to the physical object, in cooperation with the RTLS 205, may provide live location and orientation data based on which the 3D model of the physical object is posed in the 3D space. Alternatively, or in combination, the 3D model, as well as its location and orientation, may be computed based on the video captured by the head-mounted camera 224. To that end, the camera 224 may be calibrated based on the head-mounted sensors 226 or based on image recognition techniques applied to the camera's video content; a calibrated camera allows for the mapping of each pixel of the video images to a corresponding 3D location at the scene. Thus, mapping the physical object image from the video to a real-world space (3D space) may facilitate the construction of a 3D-model of the physical object and the derivation of its location and orientation over time. In an aspect, knowledge of a 3D model of the physical object and light sources' locations at the scene may be used to compute shadows of associated virtual elements that are consistent with the shadow cast by the physical object.

During collaborative and immersive animation of virtual elements associated with a physical object participating in a show, other physical objects may be involved. For example, other physical objects—such as actors, furniture, or any other robots or physical structure at the scene—may be part of the show. Thus, in an aspect, the method 400 may also represent the other physical objects by corresponding representations, e.g., 3D models defined in the 3D space. Method 400 may then ensure that during the immersive animation of a virtual element there may not be a spatial overlap between the posed virtual element and the representations of the other physical objects in the 3D space, or that a predefined distance may be preserved (either based on artistic criteria or safety criteria). To that end, the method 400 may further detect a distance between a representation of a physical object and a virtual element being animated in the 3D space and may be configured to trigger an alert when the detected distance is below a predetermined value. Thus, special effects, intended to be performed relative to a character at the scene for example, may be virtually generated, posed, and animated before being applied. In an aspect, immersive editing of virtual effects before their application during the show may prevent causing harm to operators, building structures, show's robots, and spectators.

When multiple users collaborate, either locally (as in FIG. 1) or remotely (as in FIG. 3), method 400 may perform steps 430-460 with respect to each user. Thus, when a second user collaborates with a first user, method 400 may further present the virtual element, presented to the first user, to a second user from that second user's perspective at the scene (Box 430). The method 400 may then further generate a second edit command derived from data received from the second user's controller (Box 440) and may further adjust the pose of the virtual element according to the second edit command (Box 450). Responsive to the further adjustment by the second user, and to allow live collaborative experience for both users, the method 400 may update the virtual element's presentation of each user, so that both users may observe the further adjustment of the virtual element each from her own perspective. However, when both users attempt to edit a virtual element's pose concurrently, a conflict may be created. Thus, when a conflict exists between the first user's edit command and the second user's edit command, the method 400 may reconcile the first and the second edit commands into a new edit command according to predetermined rules of version control, e.g., the policies described herein. Then, the method 400 may adjust the pose of the virtual element according to the new edit command. Thus, to maintain a coherent animation repository 270, in an aspect, when multiple concurrent edit commands are triggered by multiple users, changes made to a virtual element, recorded in the repository, may be based on a new edit command, compiled by the version control unit 280 out of the multiple concurrent edit commands.

Figure 8:
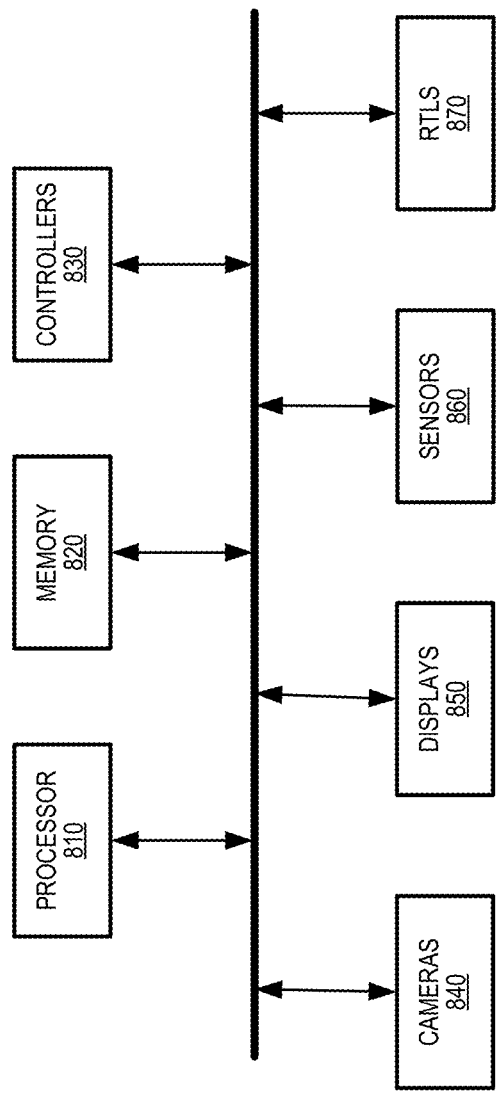
FIG. 8 is a simplified block diagram of a system, according to an aspect of the present disclosure.

FIG. 8 is a simplified block diagram of a system 800, according to an aspect of the present disclosure. The system 800 may comprise a processor 810, a memory 820, controllers 830, cameras 840, displays 850, sensors 860, and RTLS 870. The processor 810, the memory 820, the controllers 830, the cameras 840, the displays 850, the sensors 860, and the RTLS 870 may communicate with each other via communication links, including wired links, wireless links, or a combination thereof. The operation of systems and methods, as illustrated in FIGS. 1-7, may be performed by the processor 810, executing program instructions run by an operating system stored in the memory 820. The program instructions and the operating system may be written in any programming language—such as C, Java, Objective-C, C++, Python, Visual Basic, Perl—or any other programming language capable of producing instructions that are capable of execution on the processor 810.

The RTLS 870 may operate in corporation with sensors 860, attached to objects at a scene, to produce real-time positional data of respective objects. For example, positional data may be generated with respect to sensor-equipped objects, such as users' head-mounted systems 130, users' handheld controllers 140, and other physical objects at the scene 150. The cameras 840 may be users' head-mounted cameras 224 and each may capture video from a perspective of a respective user at the scene. Likewise, the displays 850 may be users' head-mounted displays 222 and each may be presenting to a respective user a composite view, including the captured video augmented by virtual elements retrieved from a repository within the memory 820. The controllers 840 may serve to generate users' edit commands and may provide means to interact with physical objects at the scene and their associated virtual elements, such as buttons or a touchscreen.

The processor 810 may include dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications to perform the methods disclosed herein.

The memory 820 may be configured to store both programs and data. As indicated, the memory 820 may store instructions for an operating system and applications that perform methods according to aspects of the present disclosure in machine readable form. For example, the memory 820 may store video data captured by the camera 840 and data maintained in the animation repository 270. The memory 820 may also store system information, user information, and the like. The memory 820 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a memory 820 or other machine readable medium, which may be incorporated into a computer program product.

The foregoing discussion has described operation of the foregoing embodiments in the context of system components, such as controllers 830, cameras 840, displays 850, sensors 860, and RTLS 870. Commonly, these components may execute programs that are stored in a local memory of those components and be executed by local processors within them. Alternatively, they may be embodied in dedicated hardware components such as application specific integrated circuits, field programmable gate arrays and/or digital signal processors. And, of course, these components may be provided as hybrid systems that distribute functionality across dedicated hardware components and programmed general purpose processors, as desired.

Several aspects of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method comprising:
   representing a physical object, present at a physical scene, using a three-dimensional (3D) model in a virtual environment associated with the physical scene;
   providing a pose for a virtual element in the virtual environment at a location relative to the 3D model of the physical object;
   displaying the virtual element to a first user from a perspective of the first user in the virtual environment;
   generating a first edit command derived from data received from a controller operated by the first user;

adjusting the pose of the virtual element in the virtual environment according to the first edit command;
updating the displaying of the virtual element to the first user according to the adjusted pose;
representing another physical object, present at the physical scene, using another 3D model in the virtual environment;
detecting a distance, in the virtual environment, between the another 3D model of the another physical object and the virtual element; and
alerting when the detected distance is below a predetermined value.

2. The method of claim 1, further comprising:
capturing, by a video camera, a video of the physical scene including the physical object, from the perspective of the first user, wherein the displaying of the virtual element to the first user comprises overlaying the virtual element on the captured video of the physical scene.

3. The method of claim 2, wherein the 3D model of the physical object is constructed based on the captured video.

4. The method of claim 1, wherein the 3D model of the physical object is constructed based on data measured by one or more sensors associated with the physical object.

5. A method comprising:
representing a physical object, present at a physical scene, using a three-dimensional (3D) model in a virtual environment associated with the physical scene;
providing a pose for a virtual element in the virtual environment at a location relative to the 3D model of the physical object;
displaying the virtual element to a first user from a perspective of the first user in the virtual environment;
generating a first edit command derived from data received from a controller operated by the first user;
adjusting the pose of the virtual element in the virtual environment according to the first edit command;
updating the displaying of the virtual element to the first user according to the adjusted pose;
displaying the virtual element to a second user from a perspective of the second user in the virtual environment;
generating a second edit command derived from second data received from a second controller operated by the second user;
determining a conflict between the first edit command and the second edit command;
reconciling, in response to determining the conflict, the first edit command and the second edit command into a third edit command;
further adjusting the adjusted pose of the virtual element in the virtual environment according to the third edit command; and
further updating the displaying of the virtual element to the first user and to the second user according to the further adjusted pose.

6. The method of claim 5, wherein the first user and the second user are located remotely from each other and wherein the virtual environment is further associated with a physical scene at which the second user is located.

7. The method of claim 5, further comprising:
displaying a graphical representation of the first user to the second user from the perspective of the second user in the virtual environment.

8. The method of claim 5, further comprising:
displaying a graphical representation of the 3D model of the physical object to the second user from the perspective of the second user in the virtual environment.

9. The method of claim 5, further comprising:
capturing, by a video camera, a video of the physical scene including the physical object, from the perspective of the first user, wherein the displaying of the virtual element to the first user comprises overlaying the virtual element on the captured video of the physical scene, wherein the 3D model of the physical object is constructed based on the captured video.

10. The method of claim 5, wherein the 3D model of the physical object is constructed based on data measured by one or more sensors associated with the physical object.

11. An apparatus comprising:
at least one processor; and
a memory storing instructions that, when executed by the at least one processor, cause the apparatus to:
represent a physical object, present at a physical scene, using a three-dimensional (3D) model in a virtual environment associated with the physical scene;
provide a pose for a virtual element in the virtual environment at a location relative to the 3D model of the physical object;
display the virtual element to a first user from a perspective of the first user in the virtual environment;
generate a first edit command derived from data received from a controller operated by the first user;
adjust the pose of the virtual element in the virtual environment according to the first edit command;
update the displaying of the virtual element to the first user according to the adjusted pose;
represent another physical object, present at the physical scene, using another 3D model in the virtual environment;
detect a distance, in the virtual environment, between the another 3D model of the another physical object and the virtual element; and
alert when the detected distance is below a predetermined value.

12. The apparatus of claim 11, wherein the memory storing instructions that, when executed by the at least one processor, further cause the apparatus to:
capture, by a video camera, a video of the physical scene including the physical object, from the perspective of the first user, wherein the display of the virtual element to the first user comprises overlaying the virtual element on the captured video of the physical scene.

13. The apparatus of claim 12, wherein the 3D model of the physical object is constructed based on the captured video.

14. The apparatus of claim 11, wherein the 3D model of the physical object is constructed based on data measured by one or more sensors associated with the physical object.

15. An apparatus comprising:
at least one processor; and
a memory storing instructions that, when executed by the at least one processor, cause the apparatus to:
represent a physical object, present at a physical scene, using a three-dimensional (3D) model in a virtual environment associated with the physical scene;
provide a pose for a virtual element in the virtual environment at a location relative to the 3D model of the physical object;

display the virtual element to a first user from a perspective of the first user in the virtual environment;

generate a first edit command derived from data received from a controller operated by the first user;

adjust the pose of the virtual element in the virtual environment according to the first edit command;

update the displaying of the virtual element to the first user according to the adjusted pose;

display the virtual element to a second user from a perspective of the second user in the virtual environment;

generate a second edit command derived from second data received from a second controller operated by the second user;

determine a conflict between the first edit command and the second edit command;

reconcile, in response to determining the conflict, the first edit command and the second edit command into a third edit command;

further adjust the adjusted pose of the virtual element in the virtual environment according to the third edit command; and further update the displaying of the virtual element to the first user and to the second user according to the further adjusted pose.

16. The apparatus of claim 15, wherein the first user and the second user are located remotely from each other and wherein the virtual environment is further associated with a physical scene at which the second user is located.

17. The apparatus of claim 15, wherein the memory storing instructions that, when executed by the at least one processor, further cause the apparatus to:

display a graphical representation of the first user to the second user from the perspective of the second user in the virtual environment.

18. The apparatus of claim 15, wherein the memory storing instructions that, when executed by the at least one processor, further cause the apparatus to:

display a graphical representation of the 3D model of the physical object to the second user from the perspective of the second user in the virtual environment.

19. The apparatus of claim 15, wherein the memory storing instructions that, when executed by the at least one processor, further cause the apparatus to:

capture, by a video camera, a video of the physical scene including the physical object, from the perspective of the first user, wherein the displaying of the virtual element to the first user comprises overlaying the virtual element on the captured video of the physical scene, wherein the 3D model of the physical object is constructed based on the captured video.

20. The apparatus of claim 15, wherein the 3D model of the physical object is constructed based on data measured by one or more sensors associated with the physical object.

* * * * *